(12) United States Patent
Tsuchiya

(10) Patent No.: US 6,334,827 B1
(45) Date of Patent: Jan. 1, 2002

(54) PULLEY BELT INSTALLER FOR A BELT-TYPE STEPLESS TRANSMISSION

(75) Inventor: Shinsuke Tsuchiya, Shizuoka-ken (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/593,607

(22) Filed: Jun. 12, 2000

(30) Foreign Application Priority Data

Jun. 14, 1999 (JP) .......................................... 11-166709

(51) Int. Cl.[7] .............................. B23P 21/00; F16H 7/24
(52) U.S. Cl. .......................... 474/119; 474/8; 474/130
(58) Field of Search ................ 474/130, 119, 474/101, 8

(56) References Cited

FOREIGN PATENT DOCUMENTS

| JP | 8-215953 A | * | 8/1996 |
| JP | 2681595 | | 8/1997 |
| JP | 10-26197 A | * | 1/1998 |

* cited by examiner

Primary Examiner—Rodney H. Bonck
(74) Attorney, Agent, or Firm—McDermott, Will & Emery

(57) ABSTRACT

A pulley belt installer has a pulley holder (6) for holding one pulley (2) of a pair of pulleys, a held pulley width expander (5) for expanding the groove width of the pulley held by the pulley holder, a pulley belt holder (8) for holding a pulley belt in the condition in which part of the pulley belt (PB) is located in the groove of the pulley held by the pulley holder, and a pulley rotator (16) for rotating the other pulley (1) at least 90 degrees in the condition in which another part of the held pulley belt is located in the groove of the other pulley, so that the center axes of both pulleys about a rotation axis intersecting with the center axis of the other pulley are parallel, thereby assembly the pulley belt without causing overlap between the surfaces of the two V-grooves of the pair of pulleys.

4 Claims, 12 Drawing Sheets

FIG.3

| Step | Operation | Type |
|---|---|---|
| 1 | Install the pulley structures 1 and 2 into the fixtures 6 and 9 and set the start switch to on. | Manual |
| | Clamp the secondary pulley structure 2 in the secondary pulley clamping cylinder 7. | Auto |
| | Rotate the output shaft of the primary pulley structure mounting rotation cylinder 11. | Auto |
| 2 | Clamp the primary pulley structure 1 in the clamping chucks 17. | Auto |
| | Raise the primary pulley structure 1 using the primary pulley elevator cylinder 12 (pull up the movable flange 1c of the primary pulley structure 1, and widen the spacing (belting sliding part) between the fixed flange 1a and the movable flange 1c by the weight of the fixed flange | Auto |
| 3 | Rotate primary pulley structure 1 counterclockwise 90 degrees. | Auto |
| 4 | Move loading shuttle 10 to the position for assembly of the pulley belt PB. | Auto |
| | Mount the pulley belt PB into the V-groove of the secondary pulley structure 2 while setting it into the pulley belt holding fixture. (Set start switch to on again.) | Manual |
| 5 | With the sliding parts of both the pulley structures 1 and 2 sufficiently opened, rotate the primary pulley structure 1 90 degrees counterclockwise. | Auto |
| 6 | Raise the primary pulley positioning/fixing cylinder. | Auto |
| | Unclamp the primary pulley structure 1 from the clamped condition in the clamping chuck, and set into the primary pulley positioning/fixing shaft (thereby holding the workpiece centers of both the pulley structures 1 and 2). Return the loading shuttle to the origin. Rotate the output shaft of the primary pulley structure mounting rotation cylinder 11 (returning the two clamping chucks 17 to the standby position). Lower the cylinder rod of the secondary pulley opening cylinder 5 and simultaneously unclamp the secondary pulley cylinder 7 to achieve the completed condition (at which point the spring force of the spring SP within the secondary pulley structure 2 moves the pulley belt PB toward the outer periphery of the V-groove of the secondary pulley SD). Auto | Auto |

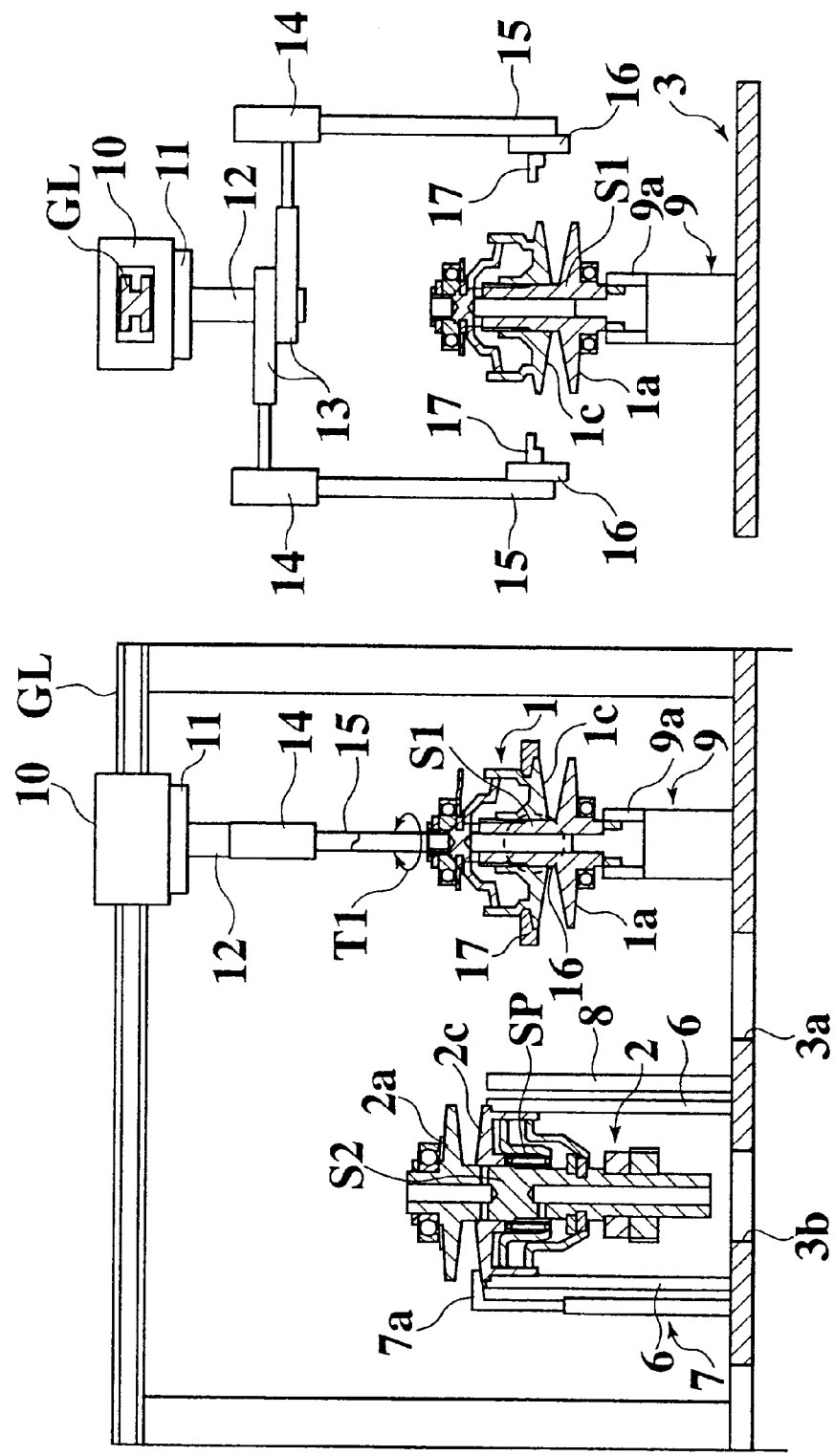

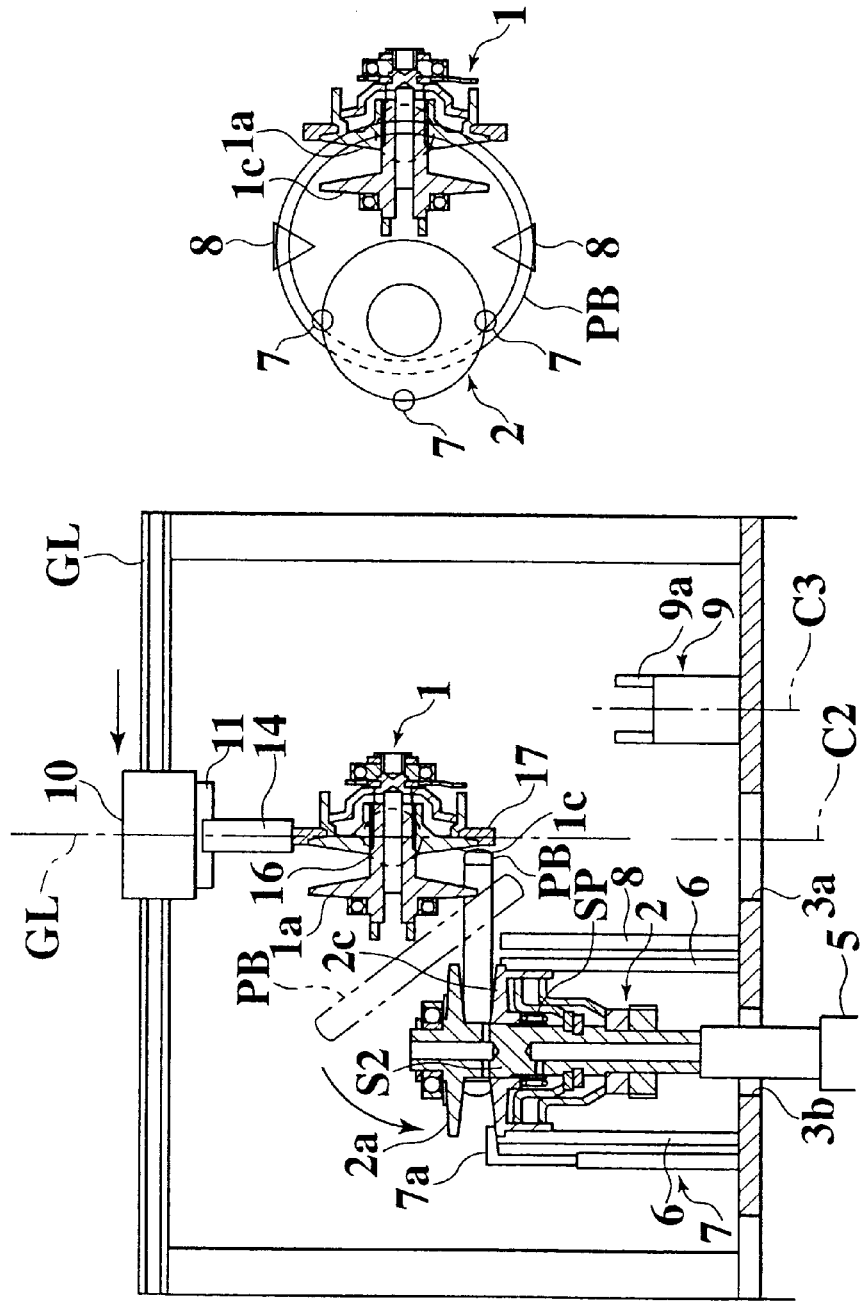

PULLEY BELT INSTALLER FOR A BELT-TYPE STEPLESS TRANSMISSION

BACKGROUND OF THE INVETION

The present invention relates to a pulley belt installer for hanging a pulley belt between a pair of pulleys in a belt type stepless transmission having a pair of pulleys with variable groove widths and a pulley belt that is hung therebetween.

The belt type stepless transmission serving to transmit motive power, such as in a vehicle, generally has, as shown in FIG. 10, a pair of pulleys, each having a V-groove with a variable width, and a pulley belt that is hung around the pulleys so as to link them, wherein by increasing and decreasing the widths of a drive-side primary pulley PM and a driven-side secondary pulley SD oppositely, the effective radii of the pulleys are continuously varied so as to achieve a stepless change in speed. In the belt-type stepless transmission shown in FIG. 10, the opposing outer-facing halves of the pair of pulleys are in the condition of a maximum speed reduction ratio, and the inner-facing halves thereof are in the condition of a minimum speed reduction ratio.

In assembling this stepless transmission, before assembling the primary pulley PM and the secondary pulley SD into a housing of the stepless transmission, it is necessary to hang a pulley belt PB between the pulley PM and the pulley SD, and because the length of the pulley belt PB is established as relatively short in the relation between the outer diameters of the pulleys PM and SD, it is difficult to install the pulley belt with both the pulleys positioning vertically. Because of this problem, a known pulley installer for installing the pulleys was disclosed in Japanese Patent No. 2681595, which is shown in FIG. 12A and FIG. 12B.

In this pulley installer of the past, as shown in FIG. 12A, a vacuum pump (not shown) is first used to develop negative pressure in a hydraulic chamber 19 of a primary pulley PM, so as to move a movable flange forming one wall part of a V-groove downward so as repel the spring force of a spring SP, thereby widening the groove of the primary pulley PM. Next, when a handle H is pulled up to an intermediate position, a roller R1 on an end part of an arm AM extending via a pivoting shaft 20 of the handle H moves downward, in response to which the primary pulley PM which had been supported by the roller R1 via an elevator stage 21 is also lowered. Then, as shown in FIG. 12B, when the handle H is pulled up further, another roller R2 provided on the handle H rises along an inclined surface of a cam plate CB mounted to a shift stage 22 as it presses against the cam plate CB, so as to push a secondary pulley SD upward at an inclination, via the shift stage 22, resulting in the secondary pulley SD to move upward at a prescribed angle, while maintaining its mutual parallelness with respect to the center of the primary pulley PM. As a result, fixed flanges of the primary pulley PM and the secondary pulley SD are pulled toward the V-groove of the other pulley, thereby reducing the shaft-to-shaft distance between the pulleys, in which condition a pulley belt PB is fitted into the V-grooves of the pulleys.

SUMMARY OF THE INVENTION

In the above-noted pulley belt installer, however, in order to shorten the shaft-to-shaft distance between the pulleys PM and SD, when installing the pulley belt PB, the pulleys PM and SD are moved so that the V-grooves overlap, and there is a chance that a pulley flange collides with the surface of a V-groove, when the V-grooves overlap, thereby resulting in damage. Because this surface of each V-groove is used as a sliding surface when the stepless transmission is operated, if the surface become damaged, there may be caused a damage to the pulley belt.

Accordingly, in view of the above-described problems with the related art, it is an object of the present invention to provide a more advantageous pulley belt installer for a belt-type stepless transmission.

An aspect of the present invention to achieve the object is a pulley belt installer for a belt-type stepless transmission including a first pulley having an expandable first groove, a second pulley having an expandable second groove, and a pulley belt for the first and second pulleys to be linked therewith, the pulley belt installer being operative to install the pulley belt around the first and second pulleys, wherein the pulley belt installer comprises a first holder configured to hold the first pulley, a first expander configured to expand the first groove, a second holder configured to hold the pulley belt with a first part thereof located in the first groove, and a rotator configured to rotate the second pulley with the second groove with a second part of the pulley belt located therein, at least at 90 degrees about a rotation axis crossing a center axis of the second pulley, into a position in which the center axis of the second pulley is paralleled to a center axis of the first pulley.

According to this aspect of the present invention, the first holder (serving as a pulley holder) holds one of a pair of pulleys (as the first pulley), the first expander (serving as a held pulley's width expander) expands a groove width of a groove (the first groove) of the held pulley, thereby reducing its pitch circle diameter, the second holder (serving as a pulley belt holder) holds a pulley belt in a condition in which a part (the first part) of the pulley belt is located in the groove of the pulley held by the pulley holder, and the rotator (serving as a pulley rotator or swinger) rotates the other of the pair of pulleys (as the second pulley) in a condition in which another part (the second part) of the held pulley belt is located in a groove (the second groove) of the other pulley, at least at 90 degrees about a rotation axis crossing a center axis of the other pulley, into a position in which the center axis of the other pulley is paralleled to a center axis of the held pulley. As the center axes are paralleled to each other by the above action, the pulley belt is installed between the pair of pulleys.

According to the pulley belt installer for a belt-type stepless transmission according to the present invention, therefore, because it is possible to install a pulley belt with causing the grooves of both pulleys to mutually overlap, it is possible to prevent damages to the pulley belt that otherwise might have been caused by damages to surfaces of the grooves of the pulleys, thereby improving the quality of the stepless transmission. Another effect of this installer is that, by automatically assembling the pulley belt, there is a reduction in the assembly steps.

BRIEF DESCRIPTION OF THE DRAWINGS

The above and further objects and novel features of the present invention will more fully appear from the following detailed description when the same is read in conjunction with the accompanying drawings, in which:

FIG. 3 is a drawing illustrating the operating procedure of the installer of FIG. 1;

FIG. 4A and FIG. 4B are a front elevation and a side elevation, respectively, of the installer of FIG. 1 in the condition in the operating step 1 of FIG. 3;

FIG. 7A and FIG. 7B are a front elevation and a side elevation, respectively, of the installer of FIG. 1 in the condition in the operating step 4 of FIG. 3;

DESCRIPTION OF THE PREFERRED EMBODIMENTS

Preferred embodiments of the present invention are described in detail below, with reference made to relevant accompanying drawings.

Figure 11:
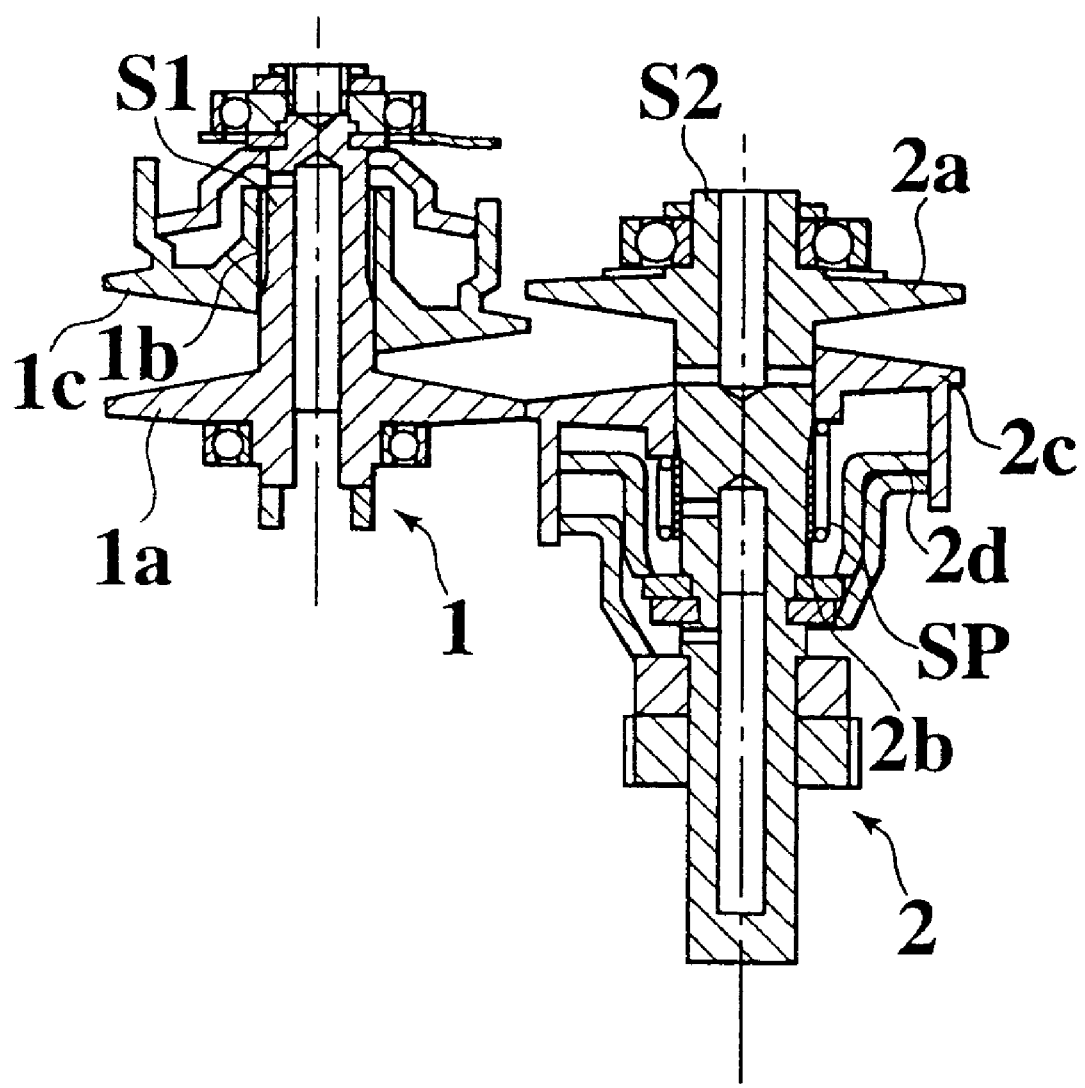
FIG. 11 is a cross-section view showing the stepless transmission of FIG. 10 in the condition in which the outer-facing halves of the primary pulley structure and the second pulley structure are set for the maximum speed reduction ratio, and the inner-facing halves thereof are set for the minimum speed reduction ratio.
Figure 12A:
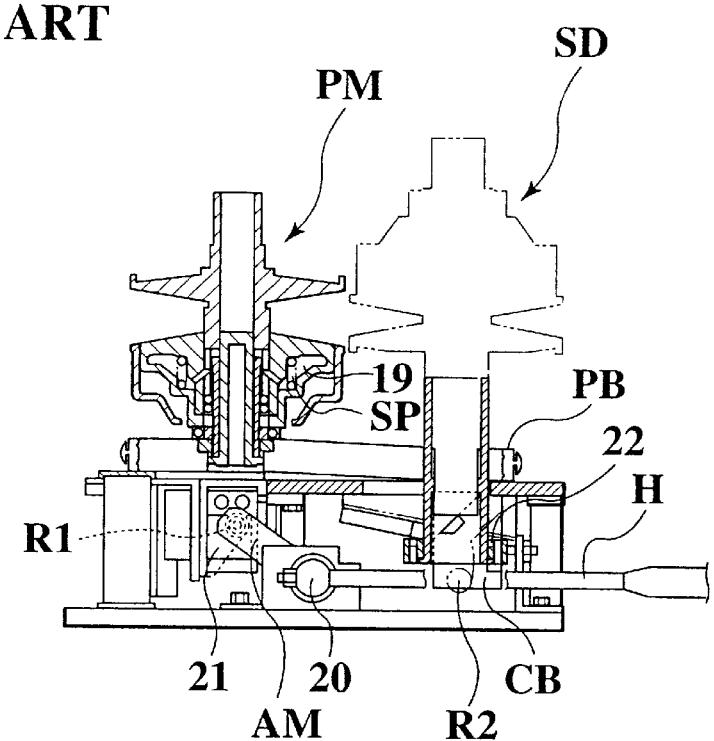
FIG. 12A is a front elevation of the configuration of a pulley belt installer of the past.
Figure 12B:
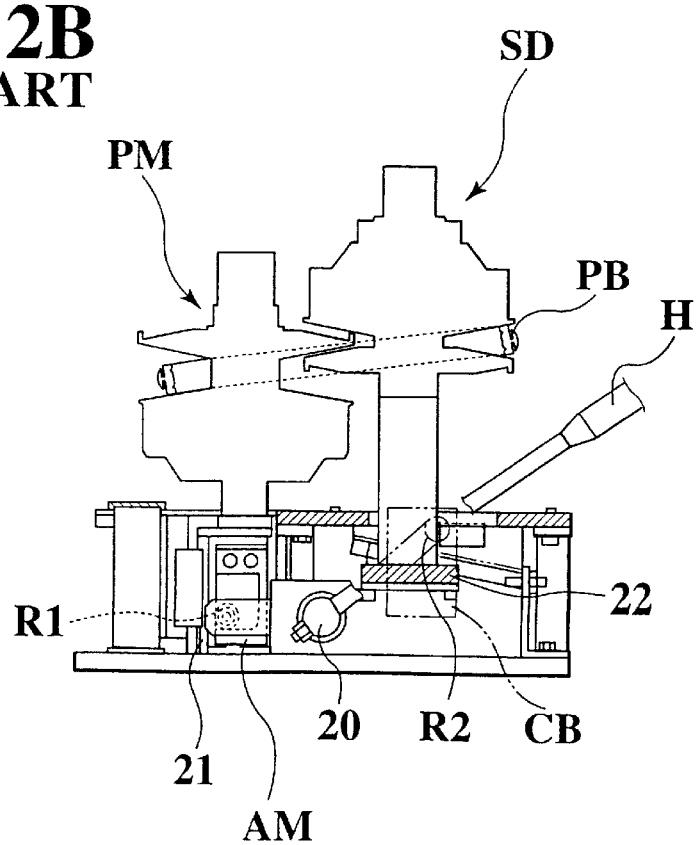
FIG. 12B is a drawing illustrating the process of pulling up the handle thereof.

As shown in FIG. 11, in the primary pulley structure 1 a pulley shaft S1 linked to a fixed flange that forms one inclined surface of the V-groove of the primary pulley PM passes through a ball spline structure having a ball 1b, and through the movable flange 1c forming the other inclined surface of the V-groove so as to be freely movable forward and back therethrough. In the secondary pulley structure 2, a pulley shaft S2 linked to a fixed flange that forms one surface of the V-groove of the secondary pulley SD passes through a ball spline structure having a ball 2b, and through the movable flange 2c that forms the other inclined surface of the V-groove, so as to be freely movable forward and back therethrough, a spring SP being interposed between the movable flange 2c and a plunger 2d so as to impel the movable flange 2c toward the fixed flange 2a.

Figure 1:
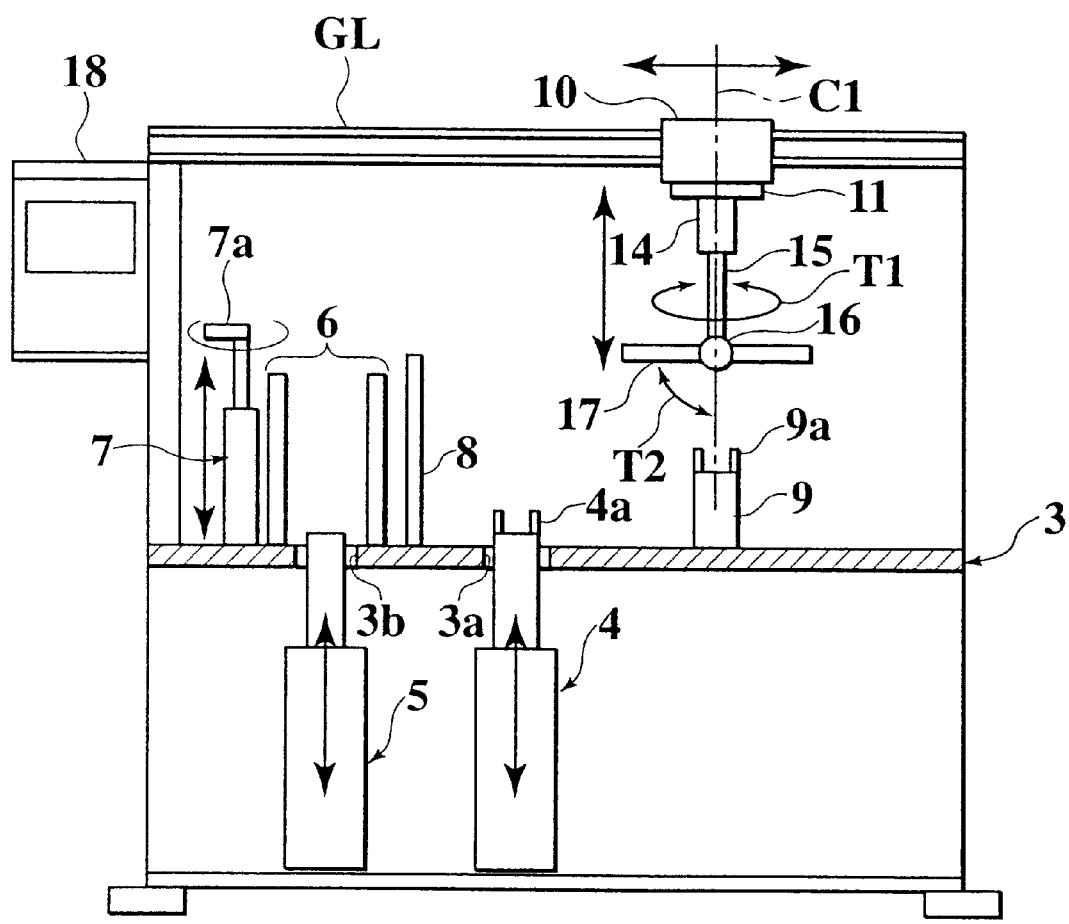
FIG. 1 is a front elevation of an embodiment of a pulley belt installer for a belt-type stepless transmission according to the present invention.
Figure 2:
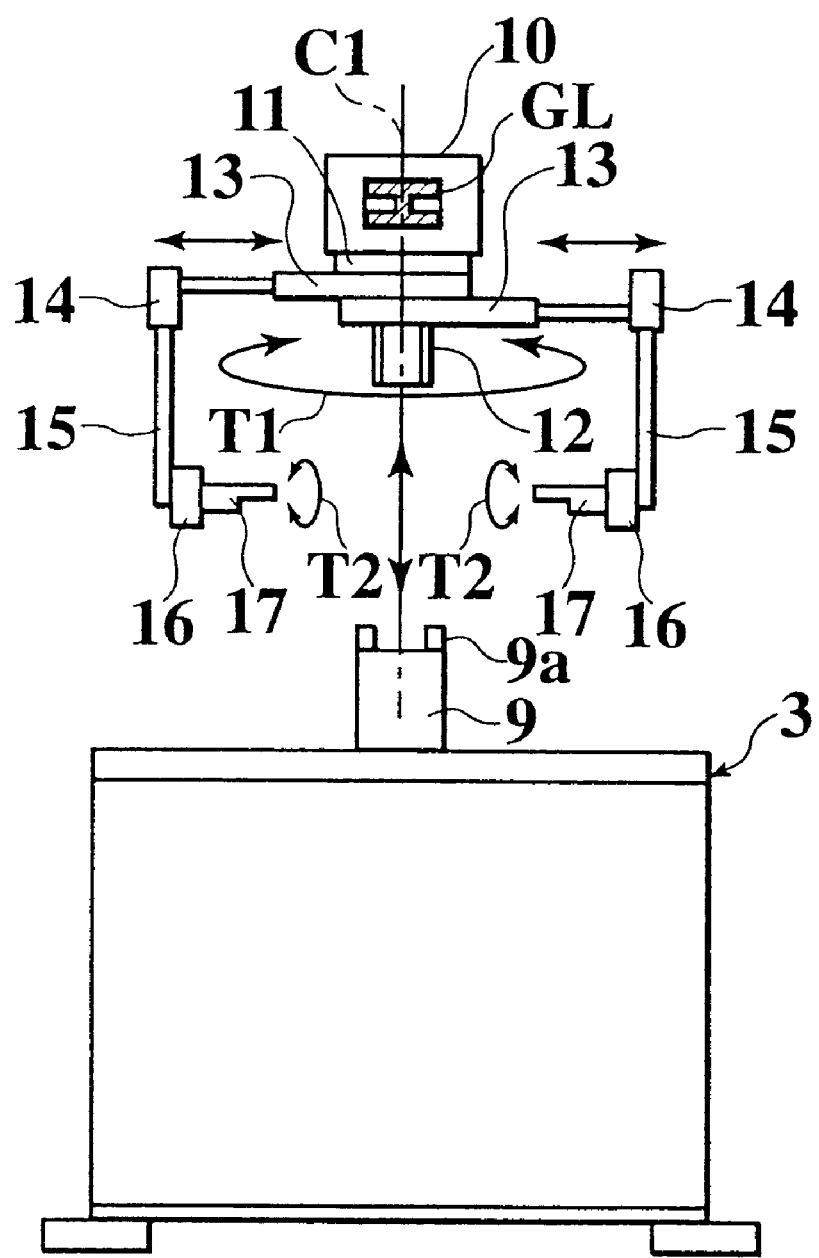
FIG. 2 is a side elevation of the installer of FIG. 1, viewed from the right side.
Figure 9:
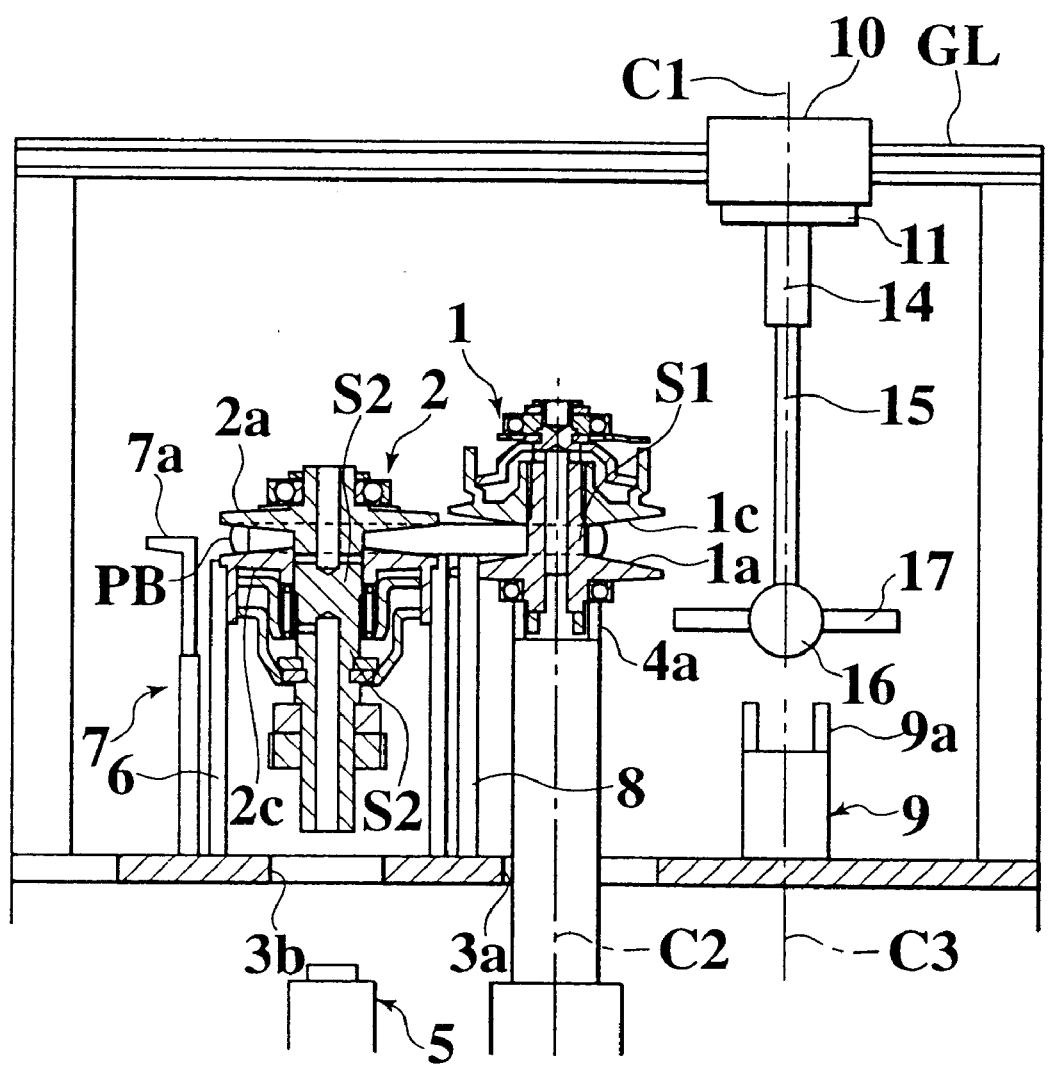
FIG. 9 is a front elevation of the installer of FIG. 1 in the condition in the operating step 6 of FIG. 3.
Figure 10:
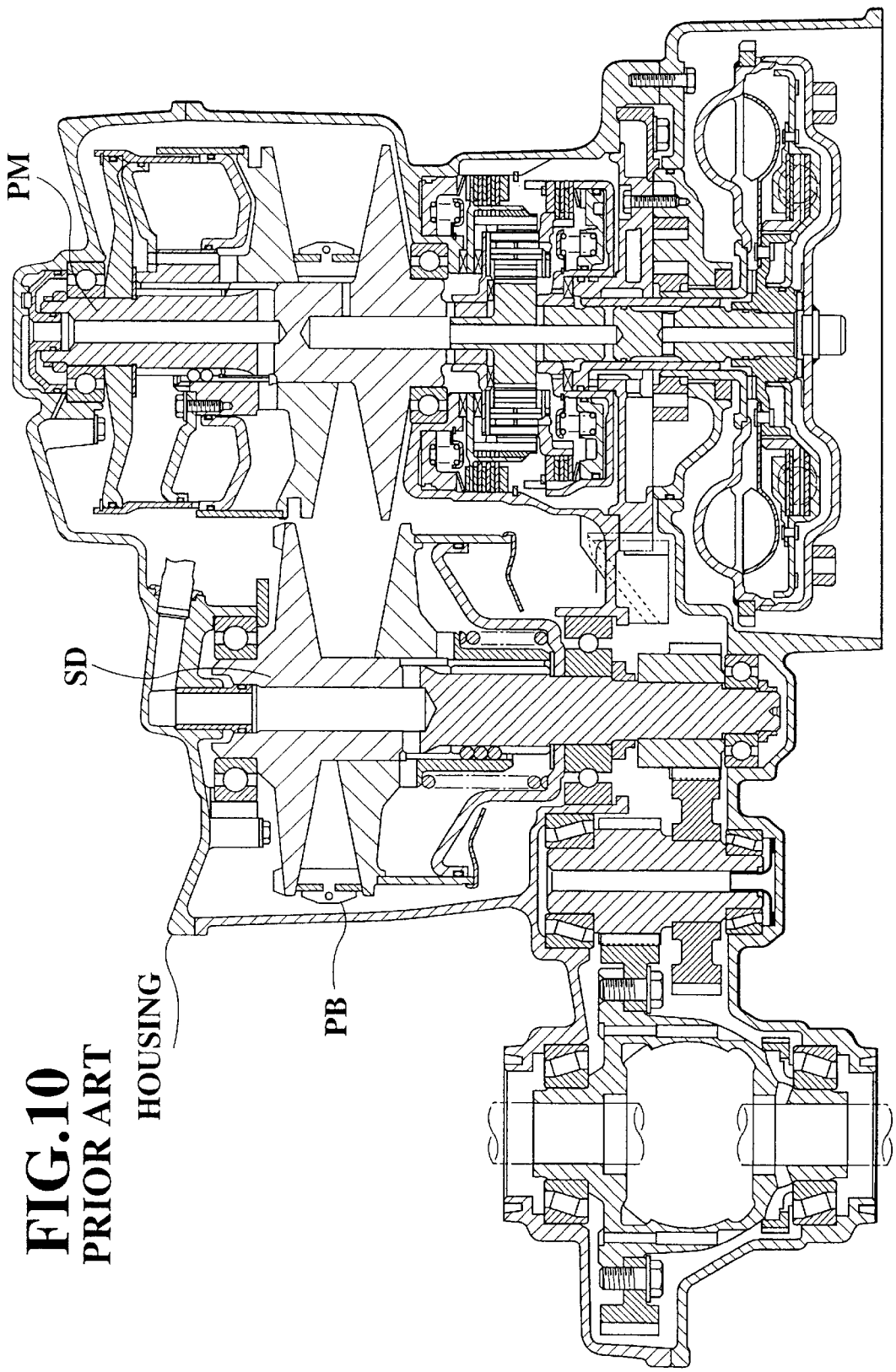
FIG. 10 is a cross-section view showing the construction of a conventional belt-type stepless transmission.

As shown in FIG. 1 and FIG. 2, in a pulley belt installer for a belt-type stepless transmission according to this embodiment, below a work stage 3 of the installer are provided a primary pulley positioning/fixing air cylinder 4, on the end of the rod of which is provided a supporting shape 4a that supports the primary pulley structure 1, and a secondary pulley opening air cylinder 5, which serves to expand the width of the held pulley. These elements are provided in positions such that, when the primary pulley structure 1 and the secondary pulley structure 2 are held, as shown in FIG. 9, these pulley structures are substantially in the condition in which the stepless transmission is assembled.

Through holes 3a and 3b are formed in work stage 3 above the primary pulley positioning/fixing stage 4 and the secondary pulley opening cylinder 5 and so as to pass through each of the associated cylinder rods. On the upper surface of the work stage 3 in the area surrounding the through hole 3b, secondary pulley positioning fixtures 6 are erected, on the outside of which are erected secondary pulley clamping cylinders 7, which are swinging type air cylinders, at three locations, clamping arms 7a being provided on the end parts of the rods thereof. On the top of the work stage 3 is erected a pulley belt holding fixture 8 as a means for holding the pulley belt, at positions on both sides of a straight line joining the center points of the through holes 3a and 3b.

On the upper surface of the work stage 3 in the region of the primary pulley positioning/fixing cylinder 4 is erected a primary pulley positioning fixture 9 having a supporting shape 9a for supporting the primary pulley structure 1. A guide rail GL is provided along the upper part of the pulley belt installer parallel to a straight line connecting the center axes of the primary pulley positioning/fixing cylinder 4 and the primary pulley positioning fixture 9, a loading shuttle 10 being provided so as to enable it to run along the guide rail GL. A primary pulley structure mounting rotating cylinder 11 hangs downward from the bottom surface of the loading shuttle 10, and a primary pulley elevator cylinder 12 hangs from the bottom surface of the primary pulley structure mounting rotating cylinder 11 as a rotating pulley width expander, with the cylinder rod thereof directed downward. The primary pulley structure mounting rotating cylinder 11 is controlled by air so as to cause the primary pulley elevator cylinder 12 to reciprocally swing by 90 degrees about the vertical axis C1 as shown by the arrow T1 in FIG. 1 and FIG. 2, and to stop. In the region of the end of the cylinder rod of the primary pulley elevator cylinder 12 are two primary pulley clamping air cylinders 13, mounted so that their respective cylinder rods are mutually opposing and perpendicular to the vertical axis C1, these primary pulley clamping air cylinders 13 being controlled so as to advance and retract in mutual synchronization and at equal distances.

Figure 5B:
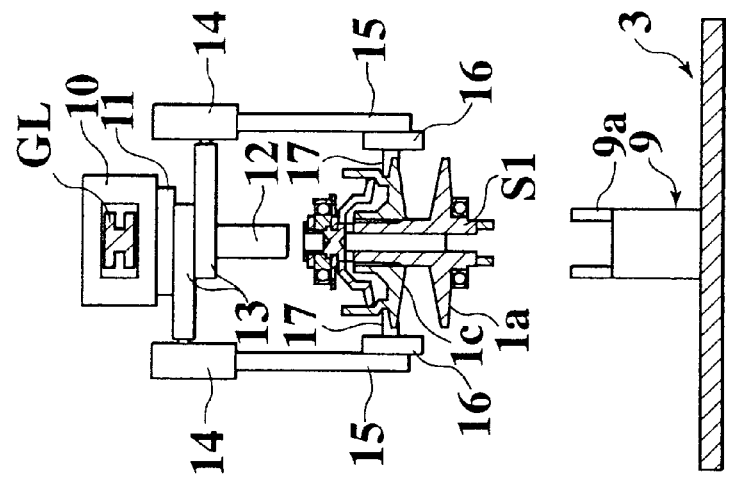
FIG. 5A and FIG. 5B are a front elevation and a side elevation, respectively, of the installer of FIG. 1 in the condition in the operating step 2 of FIG. 3.
Figure 6B:
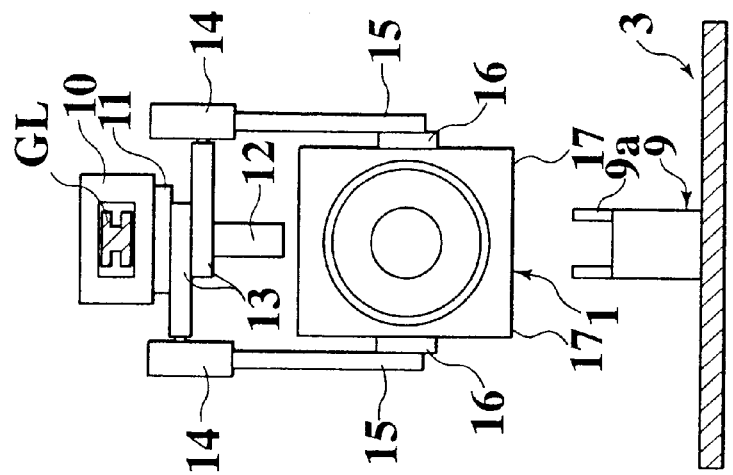
FIG. 6A and FIG. 6B are a front elevation and a side elevation, respectively, of the installer of FIG. 1 in the condition in the operating step 3 of FIG. 3.

Additionally, clamping arms 15 hang perpendicular to the cylinder rods and with a clamping arm mounting member 14 therebetween, on the end parts of the cylinder rods of two primary pulley clamping cylinders 13. From the lower ends of the clamping arms 15 pulley swinging mechanisms 16 are mounted as pulley rotator, with the output shafts thereof directed toward the vertical axis C1, and on the ends of these output shafts, as shown in FIG. 6B, are mounted planar clamping chucks 17 with depressions that mate wit the pulleys. The pulley swinging mechanism 16 has an air cylinder, which is controlled so that the clamp chuck 17, via the output shaft, reciprocally swings by 90 degrees between the horizontal position shown in FIG. 5B and the vertical position shown in FIG. 6B, and so that it stops. An operating panel is provided on the side of the pulley belt installer, this having a programmable logic controller (PLC) for controlling the operation of the air cylinders 4, 5, 7, 11, 12, 13, and 16, and the motor of the loading shuttle 10.

In operating the pulley belt installer of this embodiment, as shown in FIG. 3, first at step 1 a primary pulley structure 1 is set onto the primary pulley positioning fixture 9, with its fixed flange facing downward, and a secondary pulley structure 2 is set onto the secondary pulley positioning fixture 6, with the pulley shaft S2 facing downward. At this point, The two clamping chucks 17 are at standby positions, in which a line that joins the centers thereof is parallel to a horizontal straight line that joins the two fixtures 6 and 9, so that the two clamping fixtures 17 are located to the left and right of the fixture 9 as seen from the front of the installer, so as to facilitate the task mounting from the front of the installer, with respect to the primary pulley structure 1 set onto the primary pulley positioning fixture 9. The clamping arm 7a of the secondary pulley clamping cylinder 7 is located so as to be retracted from the second pulley structure 2 to be mounted, and at a position that is higher than the movable flange 2c thereof After mounting the pulley structures 1 and 2 onto the fixtures 6 and 9, when the start switch of the operating panel 18 is set to on, as shown in FIG. 4A and FIG. 4B, the cylinder rods of the secondary pulley cylinders 7 provided at three locations rotate and then are lowered, the clamping arms 7a of each of the clamping cylinders 7 pressing the movable flange 2c of the secondary pulley structure 2 from the top thereof, so that the secondary pulley structure 2 is held onto the fixture 6. Next, by the action of the primary pulley structure mounting rotating cylinder 11, the output shaft is rotated 90 degrees. By doing this, the two clamping chucks 17 rotate 90 degrees about the vertical axis C1, as shown by the arrow T1 in FIG. 4A, the result being that, as shown in FIG. 1 and 2, a horizontal line joining the center parts of the clamping chucks 17 and a horizontal line joining the fixtures 6 and 9 are located so as to be mutually perpendicular.

Figure 5A:
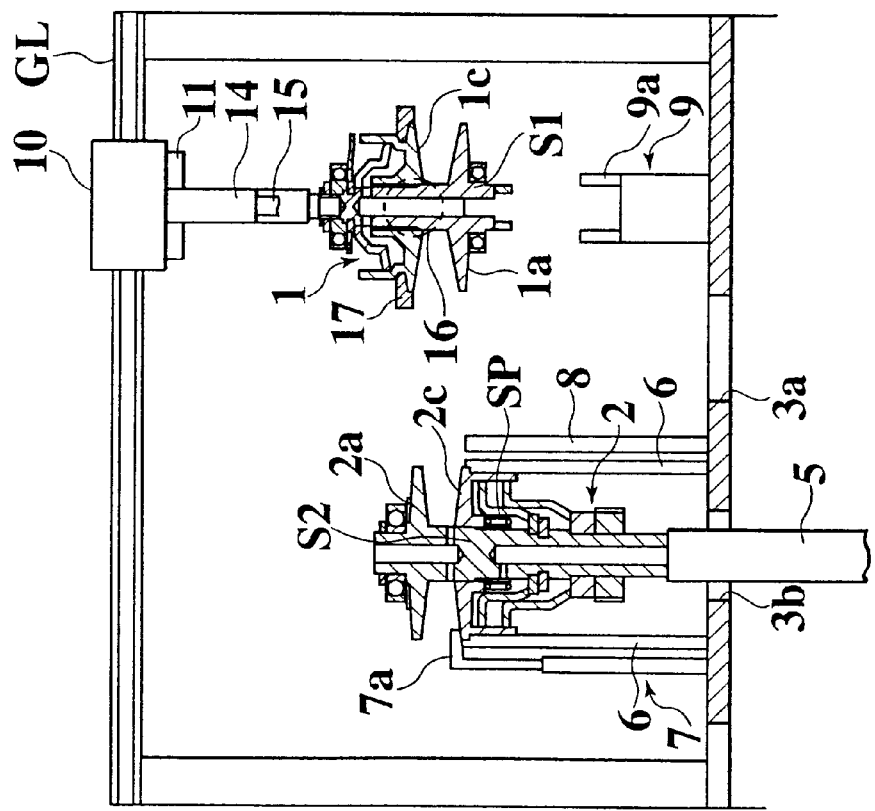

Then, the operation proceeds to step 2 of FIG. 3. At this point, as shown in FIG. 5A and 5B, first by the action of the two primary pulley clamping cylinders 13, the rods of the primary pulley clamping cylinders 13 retract, so that the movable flange 1c of the primary pulley structure 1 is held between the two ends thereof, the primary pulley structure 1 being thereby clamped between the two clamping chucks 17. Next, by the action of the primary pulley elevator cylinder 12, the cylinder rods thereof rise, thereby pulling the movable flange 1c of the primary pulley structure 1 upward. When this is done, because the fixed flange 1a of the primary pulley structure 1 slides downward by the action of its own weight, the fixed flange 1a of the primary pulley structure 1 and the movable flange 1c of the primary pulley structure 1 move away from each other, the distance therebetween being maximum in this condition. After that, the primary pulley structure 1 rises until it ultimately reaches the position shown in FIG. 5A and FIG. 5B. Next, as shown in FIG. 5A, by the action of the secondary pulley opening cylinder 5, the rod thereof rises, so as to lift the secondary pulley structure upward, the width of the V-groove of the secondary pulley SD being opened to the maximum in this condition.

Figure 6A:
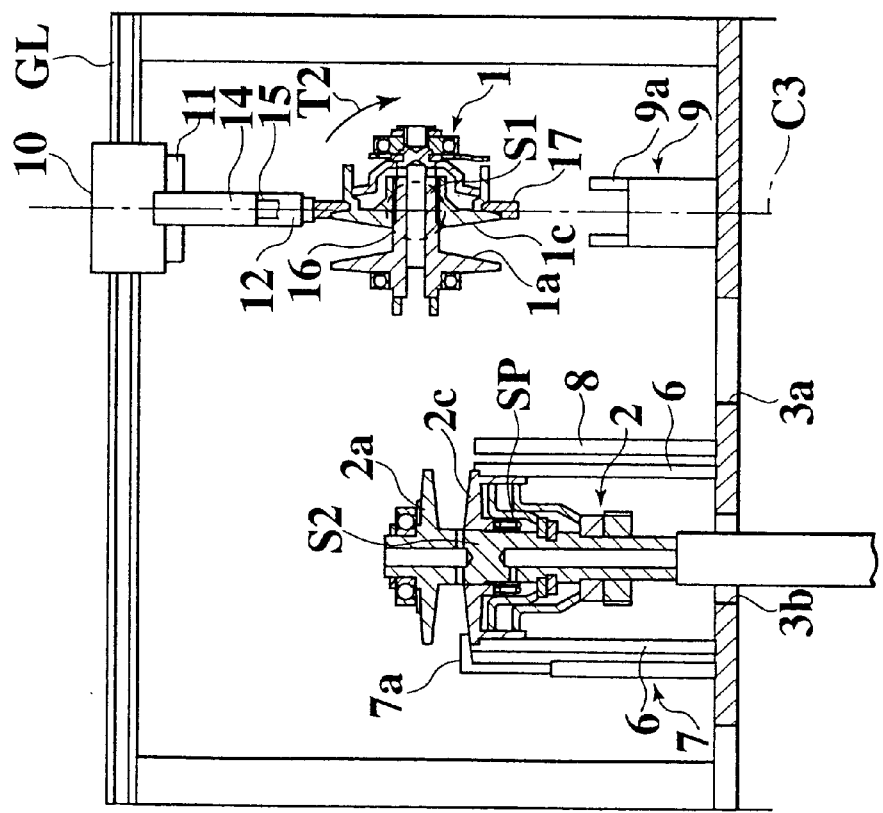

Next, the operation proceeds to step 3 shown in FIG. 3. At this point, as shown by the arrow T2 in FIG. 6A, the action of the pulley swinging mechanism 16 causes the output shaft thereof to rotate to the right 90 degrees and stop. By doing this, the primary pulley structure 1 is oriented so that its fixed flange 1a faces the secondary pulley structure 2.

Next, operation proceeds to step 4 of FIG. 3. At this point, as shown in FIG. 7A and FIG. 7B, the operation of the loading shuttle 10 causes the primary pulley structure 1 to move to the position for assembly of the pulley belt PB (the position at which the center axis C2 of the primary pulley positioning cylinder 4 and the vertical axis C1 coincide) and to stop, in which condition the operation of the pulley belt installer temporarily stops (intermediate equipment position). In this intermediate stopped condition of the pulley belt installer, a pulley belt PB inserted at an inclined position indicated by the broken lines in FIG. 7A and FIG. 7B is lowered horizontally as indicated by the arrow in the drawing and installed in the groove of the secondary pulley SD, the other part of the pulley belt being placed into the downward facing V-groove of the primary pulley PM, and in this condition the pulley belt PB is set onto the pulley belt holding fixture 8, after which the start switch on the operating panel 18 is again set to on, thereby causing progress step 5 shown in FIG. 3.

Figure 8:
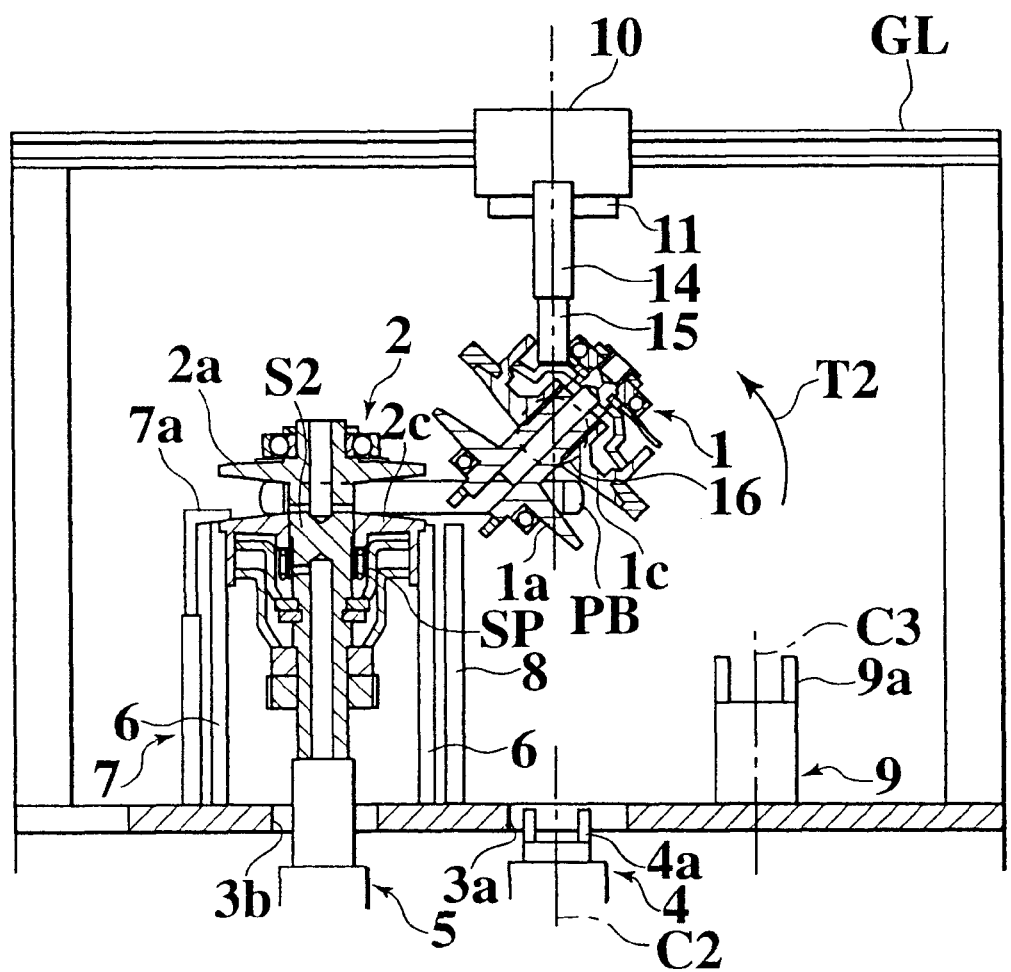
FIG. 8 is a front elevation of the installer of FIG. 1 in the condition in the operating step 5 of FIG. 3.

At the point at which step 5 is performed, because the V-grooves of the primary pulley PM and the secondary pulley SD are sufficiently opened, this operation, as indicated by the arrow T2 of FIG. 8, causes the pulley swinging mechanism 16 to rotate 90 degrees in a direction (to the left in the drawing) that is opposite to the direction of rotation by the previously described operation of step 3, and to stop. In concert with this rotation, the primary pulley structure 1 rotates so that its fixed flange 1a faces downward, thereby causing the pulley belt PB to enter the B-groove of the primary pulley structure 1. When the rotation stops, the center axes of the pulley structures 1 and 2 are parallel, and the pulley belt PB is located around the pulleys PB and SD.

Next, operation proceeds to step 6 of FIG. 3. By this operation, as shown in FIG. 9, the action of the primary pulley positioning/fixing cylinder 4 causes the rod thereof to rise, thereby causing the support shape 4a thereof to engage with the lower end part of the primary pulley structure 1. By this action, the primary pulley structure 1 is supported by the primary pulley positioning/fixing cylinder 4 at a prescribed position. Then, by the action of two primary pulley clamping cylinders 13 not shown here, the associated cylinder rods advance, so that the two clamping chucks release the primary pulley structure 1. By doing this, the primary pulley structure 1 is supported at this point by only the primary pulley positioning/fixing cylinder 4. Next, the movement of the loading shuttle 10 causes return to the origin (the position at which the center axis C3 of the primary pulley positioning fixture 9 and the vertical axis C1 coincide). Next, by the action of the primary pulley structure mounting rotating cylinder 11, the output shaft thereof rotates 90 degrees, so that the two clamping chucks 17 return to the above-noted positions.

After the above, the secondary pulley opening cylinder 5 rod is lowered, causing the release of the pulley shaft S2 of the secondary pulley structure 2, simultaneously with which the action of the three secondary pulley clamping cylinders 7 cause each of the associated cylinder rods to rise, thereby causing the clamping arms 7a thereof, which had been facing inward in the radial direction, to face outward in the radial direction, so that the secondary pulley structure 2 is placed in the unclamped condition. By doing this, the fixed flange 2a of the secondary pulley structure 2 is lowered by the spring force of the spring SP, so that the pulley belt PB moves toward the outer periphery of the V-groove of the secondary pulley SD, simultaneously with which the clamping arms 7a retract from the top of the movable flange 2c and escape therefrom.

According to the pulley belt installer of the embodiment described above, therefore, it is possible to install a pulley belt around two pulleys, without causing the overlapping of the surfaces of the V-grooves of each pulley, thereby preventing breakage of the pulley belt caused by damage to the surfaces of the V-grooves, and improving the quality of the stepless transmission. Furthermore, because the pulley belt is assembled automatically, there is a reduction in the number of assembly steps. In addition, it is possible to easily open up the V-groove of the secondary pulley SD to the maximum width by merely the advance of the rod of the secondary pulley opening cylinder 5, and to easily open up the V-groove of the primary pulley PM by merely holding the movable flange thereof and lifted it. When the pulley belt PB is installed around the primary pulley PM and the secondary pulley SD, because the V-grooves of the pulleys are set at the maximum widths, insertion of the pulley belt into the V-grooves is facilitated.

Although the foregoing embodiment used air pressure as the driving power source for the primary pulley positioning/ fixing cylinder 4, the secondary pulley opening cylinder 5, the secondary pulley clamping cylinder 7, the primary pulley structure mounting rotating cylinder 11, the primary pulley elevator cylinder 12, and the two primary pulley clamping cylinders 13, it is alternatively possible to use a hydraulic or electrical drive. Additionally, while in the foregoing embodiment the movable flange 2c of the secondary pulley structure 2 is held in place by claming arms 7a, it is alternatively possible to hold it between the clamping chuck 17, as is done with the primary pulley structure 1.

As will be seen from the foregoing description, in a pulley belt installer for a belt-type stepless transmission according to the embodiment, the pulley holder can hold the movable flange of the pulley in the condition in which it is linked to the fixed flange of the pulley, and in which the pulley shaft which passes through the movable flange of the pulley so as to be freely movable forward and back is directed toward the held pulley width expander, and if this is done the held pulley width expander merely presses the pulley shaft toward the held pulley width expander to move the fixed flange away from the movable flange, thereby easily expanding the width of the groove of the pulley.

The pulley belt installer for a belt-type stepless transmission according to the embodiment further has a rotating pulley width expander that is provided on the pulley rotator, and which lifts up the movable flange of the pulley, causing the fixed flange, which is linked to the pulley shaft passing through the movable shaft to move away from the movable flange by the action of its own weight. If this is done, by merely lifting up the movable flange, the fixed flange is moved away from the movable flange, thereby facilitating expansion of the width of the groove of the pulley. Furthermore, by expanding the width of the grooves of both of the pair of pulleys, it is easy to insert the pulley belt into the V-grooves of the pulleys.

The contents of Japanese Patent Application No. 11-166709 are incorporated herein by reference.

While a preferred embodiment of the present invention has been described using specific examples, such descriptions are for illustrative purposes, and it is to be understood that changes and variations may be made without departing from the spirit or scope of the following claims.

What is claimed is:

1. A pulley belt installer for a belt-type stepless transmission including:

a first pulley having an expandable first groove;

a second pulley having an expandable second groove; and a pulley belt for the first and second pulleys to be linked therewith, the pulley belt installer being configured to install the pulley belt around the first and second pulleys, wherein the pulley belt installer comprises:

a first holder configured to hold the first pulley;

a first expander configured to expand the first groove;

a second holder configured to hold the pulley belt with a first part thereof located in the first groove; and a rotator configured to rotate the second pulley with the second groove with a second part of the pulley belt located therein, at least at 90 degrees about a rotation axis crossing a center axis of the second pulley, into a position in which the center axis of the second pulley is paralleled to a center axis of the first pulley.

2. A pulley belt installer according to claim 1, wherein the first pulley has a first pulley shaft, a first fixed flange fixed to the first pulley shaft, and a first movable flange movably fitted on the first pulley shaft, and wherein the first holder is configured to hold the first movable flange with the first pulley shaft oriented toward the first expander.

3. A pulley belt installer according to claim 1, wherein the second pulley has a second pulley shaft, a second fixed flange fixed to the second pulley shaft, and a second movable flange movably fitted on the second pulley shaft, and wherein the pulley belt installer further comprises a second expander configured to expand the second groove by lifting the second movable flange, leaving the second fixed flange free to be spaced therefrom by a weight of the second fixed flange.

4. A pulley belt installer for a belt-type stepless transmission including:

a first pulley having an expandable first groove;

a second pulley having an expandable second groove; and a pulley belt for the first and second pulleys to be linked therewith, the pulley belt installer is operative for installing the pulley belt around the first and second pulleys, wherein the pulley belt installer comprises:

first holding means for holding the first pulley;

first expanding means for expanding the first groove;

second holding means for holding the pulley belt with a first part thereof located in the first groove; and rotating means for rotating the second pulley with the second groove with a second part of the pulley belt located therein, at least at 90 degrees about a rotation axis crossing a center axis of the second pulley, into a position in which the center axis of the second pulley is paralleled to a center axis of the first pulley.

* * * * *